US012326263B2

(12) United States Patent
Kozinski et al.

(10) Patent No.: US 12,326,263 B2
(45) Date of Patent: Jun. 10, 2025

(54) ILLUMINATED DISCRETIZED USER INTERFACE WITH UNIFORM APPEARANCE

(71) Applicant: Haier US Appliance Solutions, Inc., Wilmington, DE (US)

(72) Inventors: Kyle Andrew Kozinski, Louisville, KY (US); Kyle Howell, Louisville, KY (US); Zachary Tencza, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 228 days.

(21) Appl. No.: 17/990,810

(22) Filed: Nov. 21, 2022

(65) Prior Publication Data
US 2024/0167691 A1    May 23, 2024

(51) Int. Cl.
*F24C 7/08*    (2006.01)
*F21V 8/00*    (2006.01)

(52) U.S. Cl.
CPC ............ *F24C 7/086* (2013.01); *F24C 7/083* (2013.01); *G02B 6/0025* (2013.01); *G02B 6/0051* (2013.01); *G02B 6/006* (2013.01); *G02B 6/0095* (2013.01)

(58) Field of Classification Search
None
See application file for complete search history.

(56) References Cited

U.S. PATENT DOCUMENTS

| 8,730,185 | B2 | 5/2014 | Rudolph |
| 9,459,004 | B2 | 10/2016 | Bach |
| 9,528,696 | B2 | 12/2016 | Bach |
| 9,664,375 | B2 | 5/2017 | Guiset et al. |
| 9,709,284 | B2 | 7/2017 | Bach et al. |
| 2002/0043562 | A1* | 4/2002 | Zazzu ................. G06K 19/18 |
| | | | 235/457 |
| 2006/0034084 | A1* | 2/2006 | Matsuura ........... H10H 20/8515 |
| | | | 362/346 |
| 2016/0299595 | A1* | 10/2016 | Bach .................... F24C 7/086 |
| 2016/0334094 | A1* | 11/2016 | Bach .................... F24C 7/086 |
| 2017/0280513 | A1* | 9/2017 | Nam ..................... F24C 7/083 |

FOREIGN PATENT DOCUMENTS

| DE | 4100767 C2 | 3/1995 |
| EP | 2936684 B1 | 3/2017 |
| TW | I454639 B | 10/2014 |

* cited by examiner

*Primary Examiner* — Andre L Matthews
(74) *Attorney, Agent, or Firm* — Dority & Manning, P.A.

(57) ABSTRACT

A user interface assembly and a cooktop appliance having the user interface assembly is provided. The user interface assembly includes a panel with a display portion, a plurality of light sources, a diffusion stack representing the display, and a light guide having light channels to guide light from the sources through the diffusion stack to display a graphic in the display portion.

20 Claims, 10 Drawing Sheets

ILLUMINATED DISCRETIZED USER INTERFACE WITH UNIFORM APPEARANCE

FIELD OF THE INVENTION

The present disclosure relates generally to user interface assemblies for appliances, in particular cooktop appliances.

BACKGROUND OF THE INVENTION

Certain cooktop appliances may include a glass or ceramic-glass cooking panel for supporting cooking utensils such as pots, pans, and other containers. Heating elements, such as electric heating elements, may be provided for heating food items contained in the utensils. The electric heating elements can be operated at various settings, for example various power settings. A variety of controls can be provided for the heating sources such as, e.g., traditional rotatable knobs, push buttons, and/or capacitive touch sensing types of controls that rely on sensitivity to a user's touch. These controls may be provided as part of a user interface assembly for controlling various operations of the cooktop appliance.

Such user interface assemblies may use a variety of lighted features, such as, text, digits, and/or symbols, to display information to a user regarding the cooktop appliance on the surface of the cooktop appliance. For example, the upper surface of the cooking panel or panel may include a user interface area, including a display area, where information, such as whether a heating element is activated or at what heat level a heating element is set, may be displayed to the user using lighted symbols. It may be beneficial for a user to precisely determine to what heat level a heating element is set with a quick glance. This may be accomplished with a radially or linearly illuminated bar graph type display with increasing illuminated length indicative of the heating level selected. Some current displays have discrete light segments with dark areas between the segments. For design considerations, other displays have a reduced segmentation appearance but have an indistinct end point due to light bleed.

Accordingly, improvements in illuminated displays are desirable.

BRIEF DESCRIPTION OF THE INVENTION

Aspects and advantages of the invention will be set forth in part in the following description, may be apparent from the description, or may be learned through practice of the invention.

In one exemplary aspect, a user interface assembly for an appliance is provided. The user interface assembly comprises a panel including a user interface comprising a display portion within the user interface, a printed circuit board spaced from the panel and including a plurality of light sources, and a diffuser stack between the printed circuit board and the panel. A light guide is disposed between the printed circuit board and the diffuser stack, the light guide defining a thickness between an entrance side and an exit side. The light guide comprises a plurality of light channels through the thickness, wherein adjacent light channels are separated by a rib extending from the entrance side partially through the thickness. Each of the light channels surrounds a light source such that each of the light channels directs a passage of substantially all light from the light source through the light guide to the panel in order to display a graphic in the display portion.

In another example aspect, a cooktop appliance comprising a cooking zone, a plurality of heating elements adjacent to the cooking zone for heating a cooking utensil in the cooking zone and a user interface assembly is provided. The user interface assembly comprises a panel including a user interface comprising a display portion within the user interface, a printed circuit board spaced from the panel and including a plurality of light sources, and a diffuser stack between the printed circuit board and the panel. A light guide is disposed between the printed circuit board and the diffuser stack, the light guide defining a thickness between an entrance side and an exit side. The light guide comprises a plurality of light channels through the thickness, wherein adjacent light channels are separated by a rib extending from the entrance side partially through the thickness. Each of the light channels surrounds a light source such that each of the light channels directs a passage of substantially all light from the light source through the light guide to the panel in order to display a graphic in the display portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
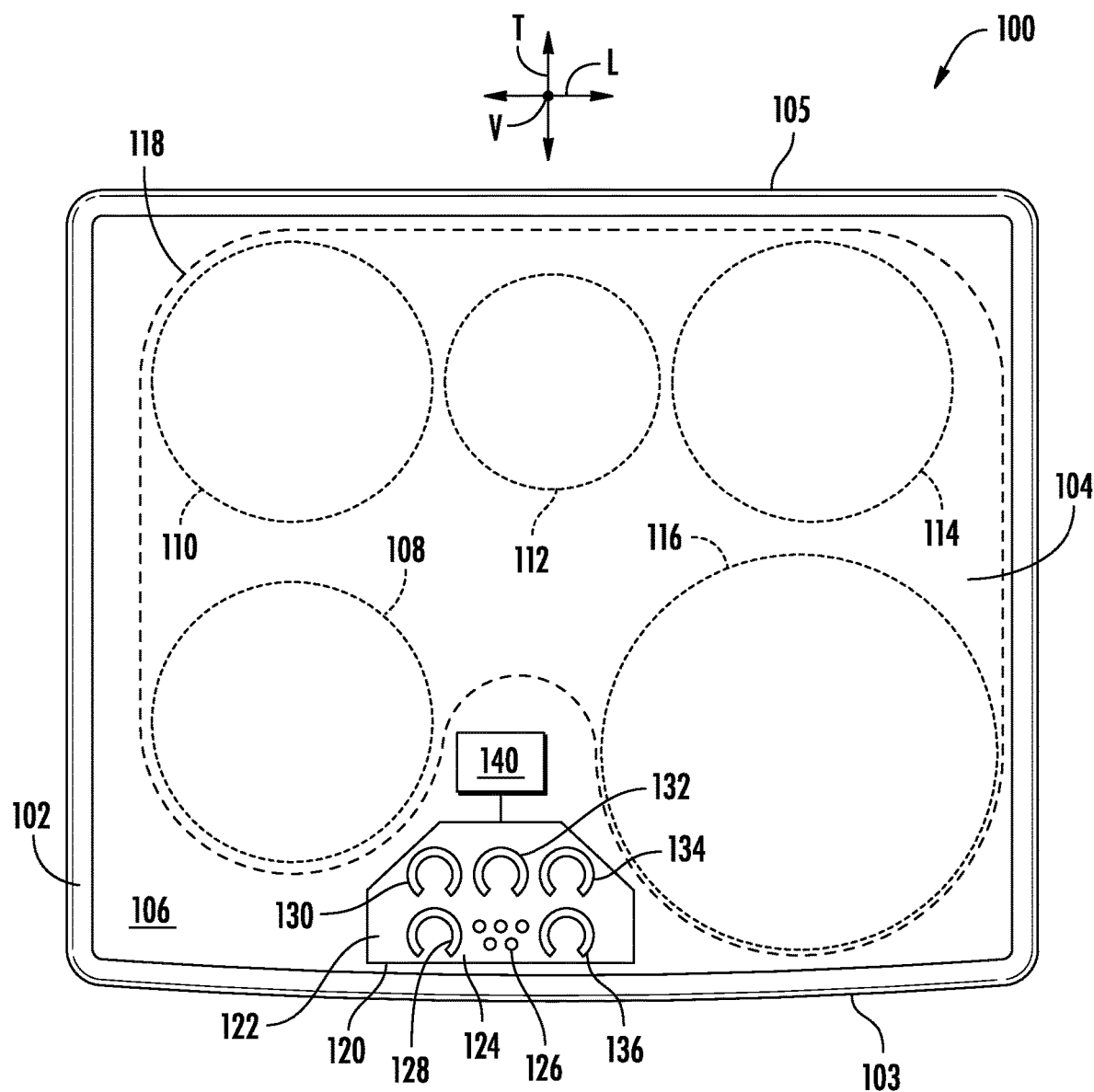
FIG. 1 provides a top perspective view of a cooktop appliance in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning to the figures, FIG. 1 provides a top, plan view of a cooktop appliance 100 according to exemplary embodiments of the present disclosure. Cooktop appliance 100 can be installed in various locations such as in cabinetry in a kitchen, with one or more ovens to form a range appliance, or as a standalone appliance. Thus, as used herein, the term "cooktop appliance" includes grill appliances, stove appliances, range appliances, and other appliances that incorporate cooktops.

According to exemplary embodiments, appliance 100 includes a cabinet 102 that is generally configured for containing or supporting various components of appliance 100 and which may also define one or more internal chambers or compartments of appliance 100. In this regard, as used herein, the terms "cabinet," "housing," and the like are generally intended to refer to an outer frame or support structure for appliance 100, (e.g., including any suitable number, type, and configuration of support structures formed from any suitable materials, such as a system of elongated support members, a plurality of interconnected panels, or some combination thereof.) It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

Cabinet 102 generally defines a mutually orthogonal vertical, lateral, and transverse direction as illustrated in FIG. 1. Cabinet 102 extends between a top and a bottom along the vertical direction V, between a first side (e.g., the left side when viewed from the top as in FIG. 1) and a second side (e.g., the right side when viewed from the top as in FIG. 1) along the lateral direction L, and between a front 103 and a rear 105 along the transverse direction T. In general, terms such as "left," "right," "front," "rear," "top," or "bottom" are used with reference to the perspective of a user accessing appliance 100.

Cooktop appliance 100 includes a cooktop plate, panel 104 (e.g., mounted to cabinet 102) for supporting cooking utensils, such as pots or pans, on a cooking or top surface 106 of panel 104. Optionally, panel 104 may be fixed or secured to cabinet 102 at its perimeter edge (e.g., such that the sides or edges of panel 104 rest on a rigid structure). When assembled, a top surface 106 is directed vertically upward to contact cooking utensils, while a bottom interior surface (not shown) is directed vertically downward opposite the top surface 106. Panel 104 may be any suitable rigid plate, such as one formed of ceramic or glass (e.g., glass ceramic). One or more electric heating assemblies 108, 110, 112, 114, 116 (collectively heating assemblies 118 and shown schematically) are mounted below panel 104 such that heating assemblies 118 are positioned below panel 104 (e.g., below the bottom interior surface along the vertical direction V). Panel 104 may be continuous over heating assemblies 118.

In some embodiments, a portion or portions of the panel 104 is coated on the bottom interior surface with an opaque coating, such as an ink. The selective application of the coating may be useful in obscuring some components of the cooktop appliance 100 below the panel 104 or for providing a display portion 122. In some embodiments, the coating may be applied opposite the display portion 122 to make contrasting graphics more obvious or clearer.

While shown with five heating assemblies 108, 110, 112, 114, and 116 in the exemplary embodiment of FIG. 1, cooktop appliance 100 may include any number of heating assemblies 118 in alternative embodiments. Heating assemblies 118 can also have various diameters. For example, each heating assembly of heating assemblies 108, 110, 112, 114, and 116 can have a different diameter, the same diameter, or any suitable combination thereof. In addition, the heating assemblies 108, 110, 112, 114, and 116 may include differing numbers or shapes of heating elements. Nonetheless, cooktop appliance 100 is provided by way of example only and is not limited to the exemplary embodiment shown in FIG. 1. For example, a cooktop appliance having one or more radiant heating assemblies in combination with one or more electric resistance heating or inductance heating elements can be provided. In addition, various combinations of number of heating assemblies, position of heating assemblies, or size of heating assemblies can be provided.

Generally, a user interface 120 provides visual information to a user and allows a user to select various options for the operation of cooktop appliance 100. For example, a display portion 122 can include a graphical representation of each of the heating assemblies 118, a desired cooking temperature, or other options. User interface 120 may also include a control portion 124 including input devices 126 to accept a user's input to control various aspects of the cooktop appliance 100. Input devices 126 may include one or more push buttons, rotating dials, or touch screens, or combinations thereof, suitable to enter instructions for the operation of aspects of the cooktop appliance 100. User interface 120 can be any type of input device and can have any configuration. In FIG. 1, user interface 120 is located within a portion of panel 104. Alternatively, user interface 120 can be positioned on a vertical surface near a front side 103 of cooktop appliance 100 or at another location that is convenient for a user to access during operation of cooktop appliance 100.

In embodiments, the user interface 120 is selectively switchable between an off condition, when all of the display elements 138 are not illuminated, and an on condition when one or more of the display elements 138 are illuminated. In embodiments, when the user interface 120 is in the off condition, the panel 104 appears as a uniformly opaque pane. The panel 104 and user interface areas are constructed so as to obscure components of the cooktop appliance 100 that lie beneath the panel 104.

Generally, cooktop appliance 100 includes a controller 140. Operation of cooktop appliance 100 is regulated by controller 140. Controller 140 is operatively coupled or in communication with the various components of cooktop appliance 100, including heating assemblies 118 and user interface 120. In response to user manipulation of the user interface 120, controller 140 operates the various components of cooktop appliance 100 to execute selected cycles and features.

Controller 140 may include memory (e.g., non-transitory media) and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 140 may be constructed without using a microprocessor (e.g., using a combination of discrete analog or digital logic circuitry, such as switches, amplifiers, integrators, comparators, flip-flops, AND gates, and the like) to perform control functionality instead of relying upon software. Heating assemblies 118, user interface 120, and other components of cooktop appliance 100 may be in communication with controller 140 via one or more signal lines or shared communication busses.

As illustrated in FIG. 1, display portion 122 of user interface 120 includes display elements 128, 130, 132, 134, and 136. As illustrated, five display elements 128, 130, 132, 134, and 136 are provided, one corresponding to each heating assembly 108, 110, 112, 114, and 116, respectively. In some embodiments, the display elements 128, 130, 132, 134, and 136 may have a linear arrangement (as in a bar graph) in which illuminated segments extend in proportion to the heat setting selected for a particular heating assembly (i.e., one of heating assemblies 118). In the embodiment illustrated in FIG. 1, the display elements 128, 130, 132, 134, and 136 have an arcuate shape in which an illuminated display increases in arc length in proportion to the selected heat setting for the corresponding heating element. The arcuate display elements 128, 130, 132, 134, and 136 are illustrative, not limiting, as the features described in the present disclosure with respect thereto may be applicable to other configurations of displays.

Figure 2:
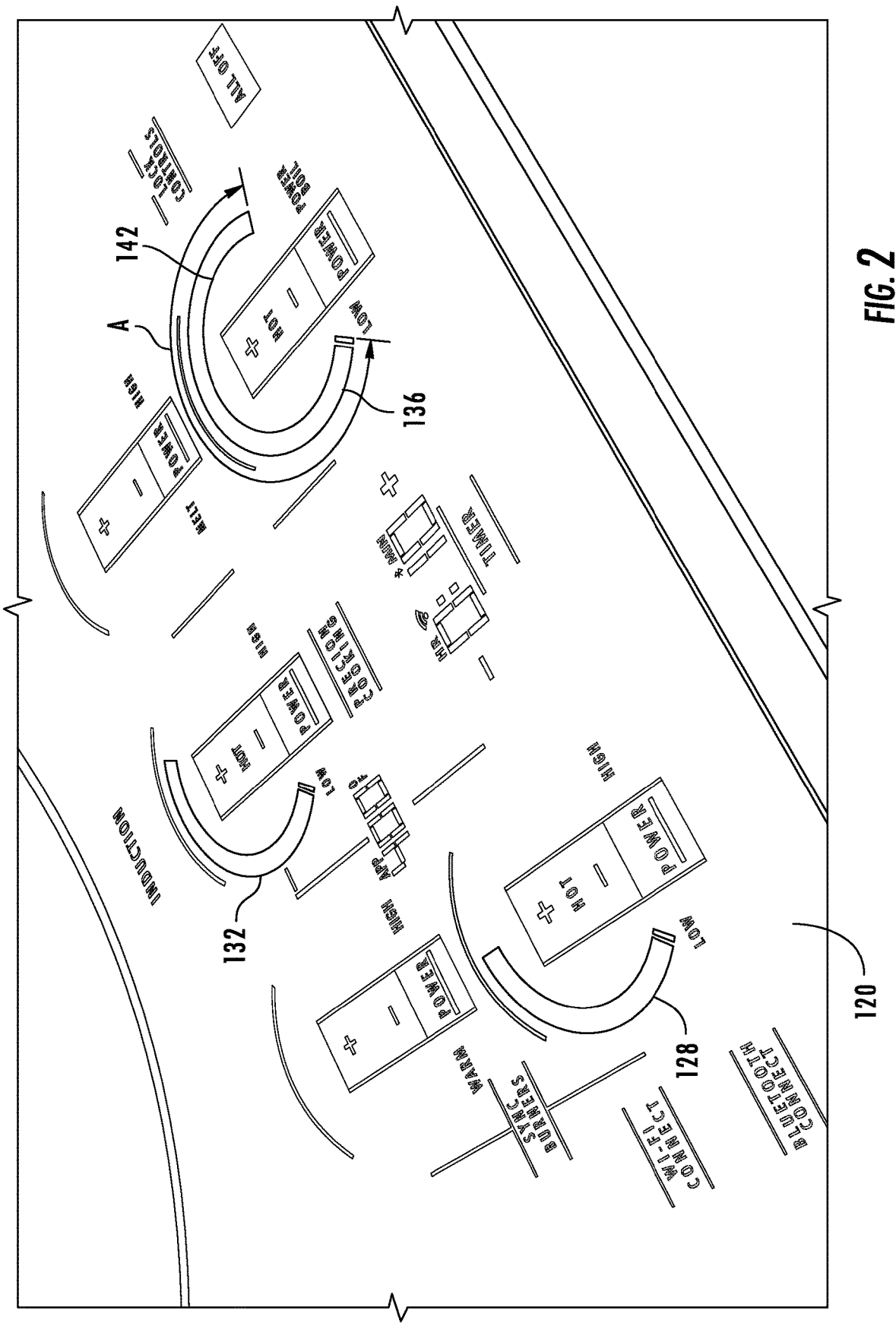
FIG. 2 provides a perspective view of a user interface for an appliance in accordance with the present disclosure.

Referring now to FIG. 2, three illuminated arcuate display elements 128, 132, and 136 are illustrated, each corresponding to a different heat setting for corresponding heating assemblies 108, 112, and 116. The heat level setting for each display element 128, 132, and 136 is proportional to the arc length of the arcuate display measured in the clockwise direction. For example, display element 128, which may correspond to similarly positioned heating assembly 108, is set at a first heat level proportional to the arc length of the display. Display element 132 may correspond to similarly positioned heating assembly 112 and is set a higher heat level as indicated by the longer arc length of the display 132. Display element 136 may correspond to similarly positioned heating assembly 116 and is set to a still higher heat level as indicated by the longer arc length of the display 136.

As illustrated in FIG. 2, the illuminated display arc 142 of display element 136 is representative of the other display elements 128, 130, 132, and 134. Each of the display arcs 142 in the user interface 120 is generally uniformly opaque for the entire arc length A.

Figure 3:
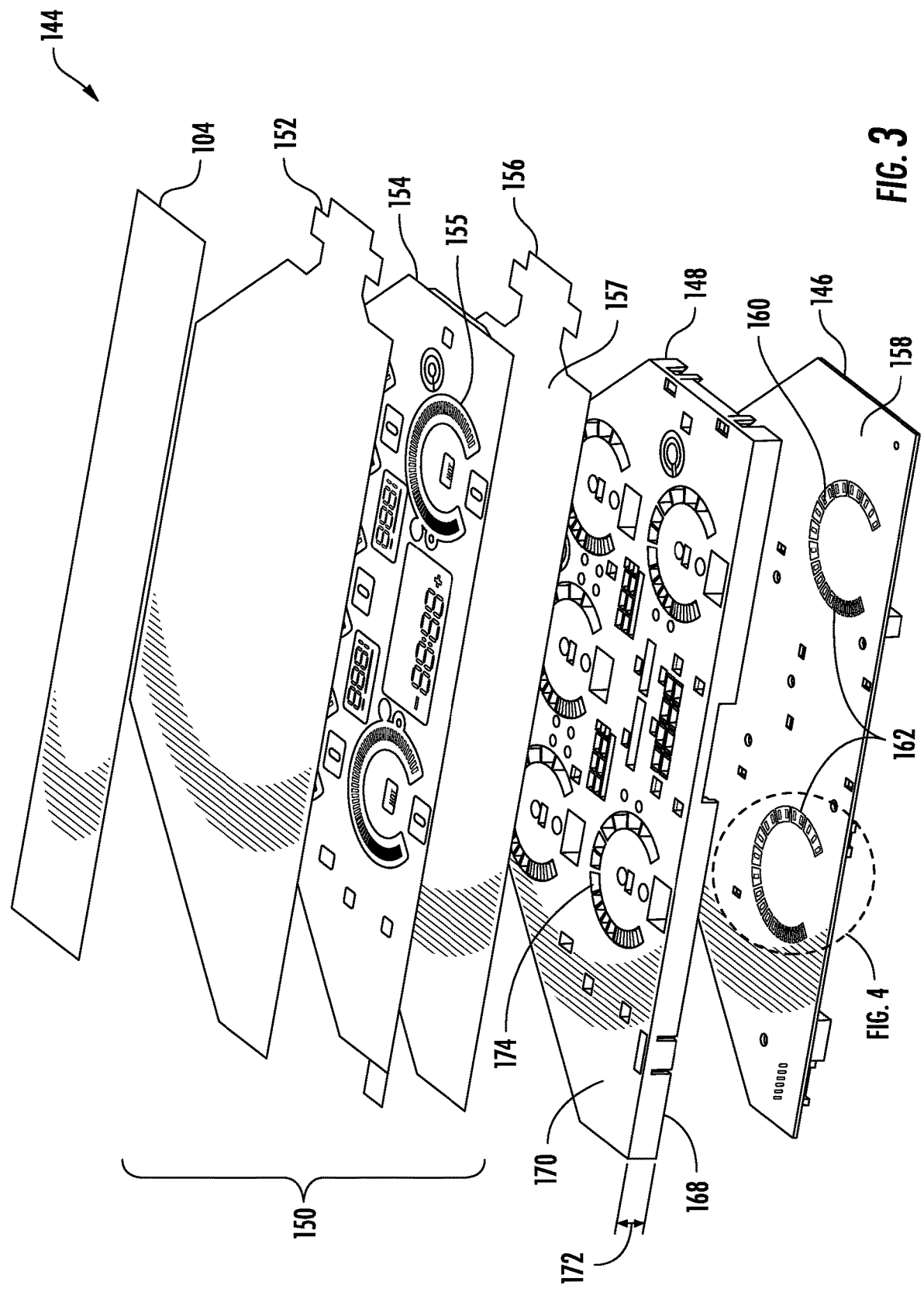
FIG. 3 provides an exploded view of a user interface assembly in accordance with the present disclosure.

FIG. 3 represents an exploded view of an illustrative user interface assembly 144 that may be employed in the user interface 120 in accordance with embodiments of this disclosure. In a normal assembled configuration, as in an operating condition, panel 104 is arranged in an abutting or touching configuration with diffuser stack 150 (specifically dead front layer 152). Primary diffuser layer 154 and textured diffuser layer 156 (if used) are each in an abutting or touching configuration with adjacent layers). Diffuser stack 150 is in an abutting or touching configuration with exit side 170 of light guide 148 and printed circuit board 146 for the user interface is abutting or touching entrance side 168 of light guide 148.

Panel 104 includes user interface 120 having a display portion 122 and a control portion 124 (FIG. 1) and comprises a topmost element in the user interface assembly 144. In FIG. 3, only the portion of the panel 104 including the user interface 120 is illustrated for clarity.

Figure 4:
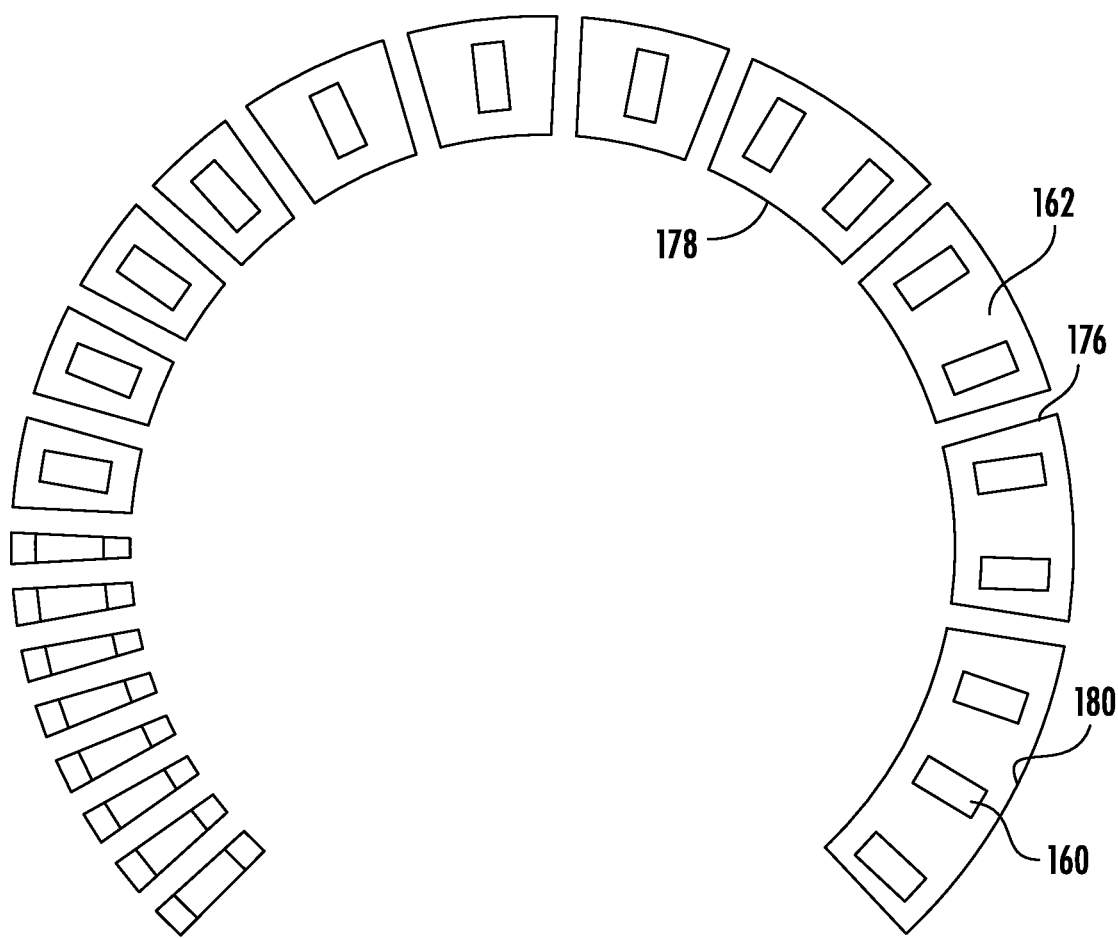
FIG. 4 provides an enlarged view of a portion of a printed circuit board for a user interface in accordance with the present disclosure.

Printed circuit board 146 is spaced apart and vertically below the panel 104 and comprises a bottommost element of the user interface assembly 144. A plurality of light sources 160 is disposed on the upper surface of the printed circuit board 146 in an arrangement 162 corresponding to the shape of the display elements 138. Two arrangements 162 of light sources 160 are shown in FIG. 3 for clarity. In embodiments, each display element 138 in display portion 122 will have an arrangement 162 of light sources 160. As will be described more fully below, one or more light sources 160 will be segmented to represent a discrete heat setting. The arrangement 162 of light sources may be best illustrated in FIG. 4. The plurality of light sources 160 may be a plurality of light emitting diodes (LEDs) of suitable illuminating power.

As illustrated in FIG. 3, a diffuser stack 150 is disposed between the printed circuit board 146 and the panel 104. The diffuser stack 150 may be comprised of one or more layers of diffusing materials. For example, as illustrated, the diffuser stack 150 comprises a dead front layer 152, a primary diffuser layer 154, and an optional textured diffuser layer 156. The primary diffuser layer 154 may be disposed between the light guide 148 and the panel 104. The dead front layer 152 may be disposed between the primary diffuser layer 154 and the panel 104.

The primary diffuser layer 154 influences the scattering distribution of the incident light from the plurality of light sources 160. The scattering may be beneficial in reducing the appearance of hot spots, i.e., areas of higher intensity light, from the light sources 160. The scattering may also be beneficial in reducing the appearance of segmentation, giving the display elements 138 a uniform appearance. In some embodiments, the scattering angle, or diffusion angle, is between 15 degrees and 30 degrees, more preferably between 15 degrees and 20 degrees, more preferably still, the scattering angle is 15 degrees, or about 15 degrees.

The primary diffuser layer 154 may also include a graphic mask 155 representing the configuration of the display elements 138 to be displayed in the display portion 122 of the user interface 120. The graphic mask 155 may beneficially block light from the light source 160 from traveling past the primary diffuser layer 154. In general, the graphic mask 155 comprises a pattern corresponding to the display elements 138 to be presented on the user interface 120 when the light sources 160 are illuminated. The graphic mask 155 has a pattern of light transmitting portions that corresponds to the light channels 174 in the light guide 148. Any light that is diffused by the textured diffuser layer 156 or light that is naturally scattered by reflection off the light channels 174 outside of the intended illuminated display elements 138 will be blocked by the graphic mask 155 portion of the primary diffuser layer 154.

Dead front layer 152 may be color-matched to the ink or opaque coating applied to the panel 104. The color-matched dead front layer 152 and panel 104 cooperate to provide the appearance of a uniformly colored cooktop when the user interface 120 in in an off condition (i.e., not illuminated). When the user interface 120 is in an on condition (i.e., illuminated), the color-matched dead front layer 152 and panel 104 maintain a uniformly colored cooktop everywhere except for those display elements 138 that are illuminated.

The dead front layer 152 may be imparted with a matching color when fabricated or may be a clear or transparent element and receive a color matching application such as an ink layer. The dead front layer 152 may be used to obscure mechanical components (e.g., the printed circuit board 146 and the light guide 148) of the cooktop appliance and graphics of the display portion 122 when the user interface 120 is in an off condition.

The dead front layer 152 may also provide diffusion of the light emitted by the light sources 160 in forming the display elements 138. The conditioned light may be diffused by the dead front layer to more evenly distribute the light to form uniform display elements 138.

In some embodiments, the diffuser stack 150 further comprises a textured diffuser layer 156 between the primary diffuser layer 154 and the light guide 148. The textured diffuser layer 156 may be provided to impart the appearance of a specific finish on the display elements 138. For example, a textured diffuser layer 156 having a radial brush pattern formed on a surface, for example the top surface 157, may produce the appearance of brushed steel in the display elements 138. Similarly, the textured diffuser layer 156 may be provided with a marble-like texture to produce a marble appearance in the display elements 138. As the light exits the textured diffuser layer 156, the light is diffused in a pattern similar to the pattern formed on, for example, the top surface 157 and becomes a visible pattern on the display elements 138.

As illustrated in FIG. 3, the user interface assembly 144 may comprise a light guide 148 disposed between the printed circuit board 146 and the diffuser stack 150. The light guide 148 comprises an entrance side 168 and an exit side 170 defining a thickness 172 therebetween. Entrance side 168 and exit side 170 may be parallel. A plurality of light channels 174 are formed through the thickness 172.

Figure 5:
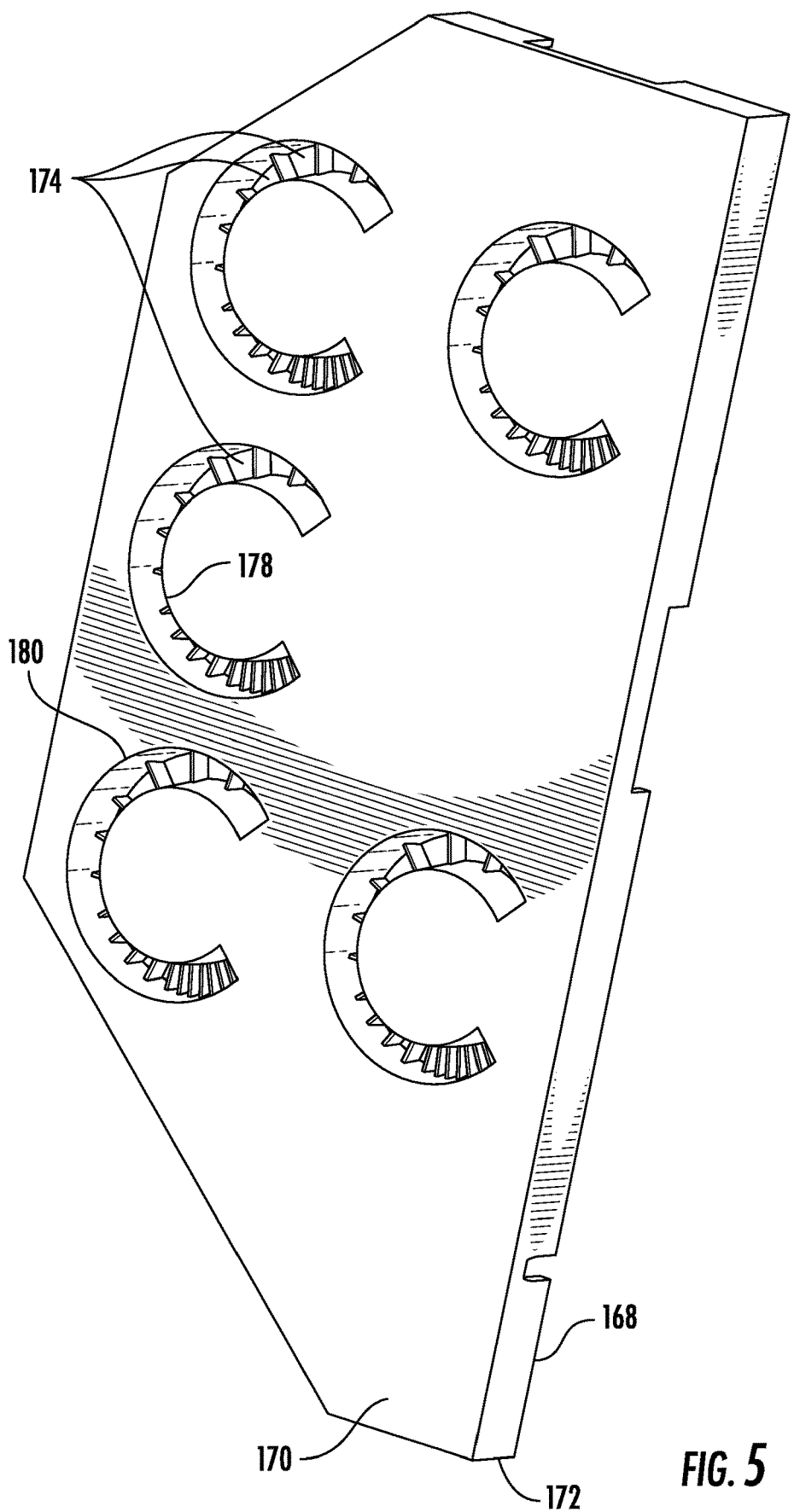
FIG. 5 provides a perspective view of a light guide in accordance with the present disclosure.
Figure 6:
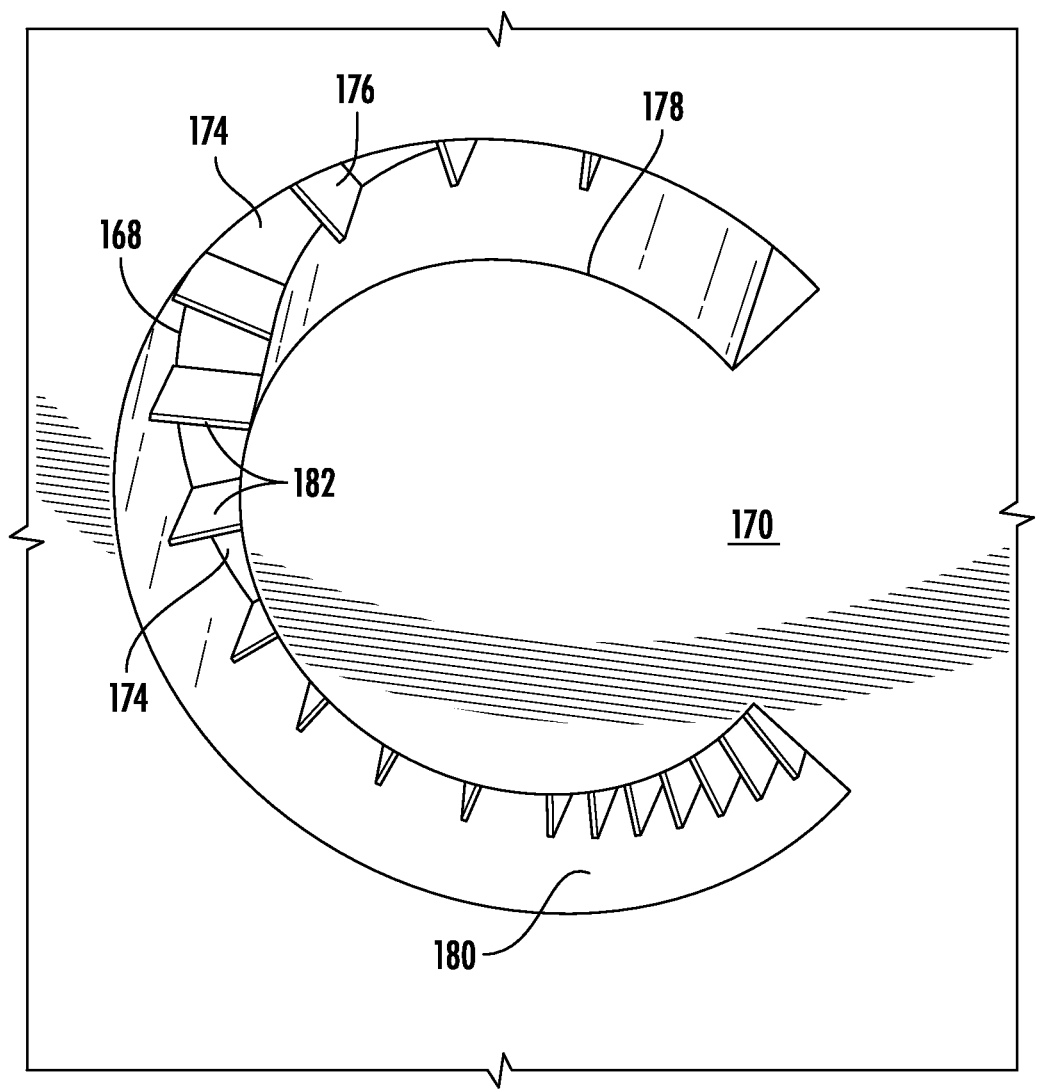
FIG. 6 provides an enlarged view of a portion of the light guide of FIG. 5.

As may be better understood from FIGS. 5 and 6, adjacent light channels 174 are separated by rib 176. The ribs 176 extend from the entrance side 168 only partially through the thickness 172. In some embodiments, the ribs 176 extend between 25% and 75% of the light guide 148 thickness 172. More preferably, the ribs 176 extend between 35% and 65% of the thickness 172, more preferably still the ribs 176 extend through 50%, or approximately 50%, of the light guide thickness 172.

The plurality of light channels each comprise two spaced apart walls, inner wall 178 and outer wall 180, joined by at least one rib 176. In the exemplary embodiment illustrated, inner and outer walls 178, 180 are concentric arcs, each having a constant radius. In other embodiments, the spaced apart inner and outer walls 178, 180 may be linear parallel walls. In still other embodiments, the spaced apart inner and outer walls 178, 180 are of other configurations that correspond to the shape of the desired display elements 138 and follow the arrangement 162 of light sources 160.

Figure 7:
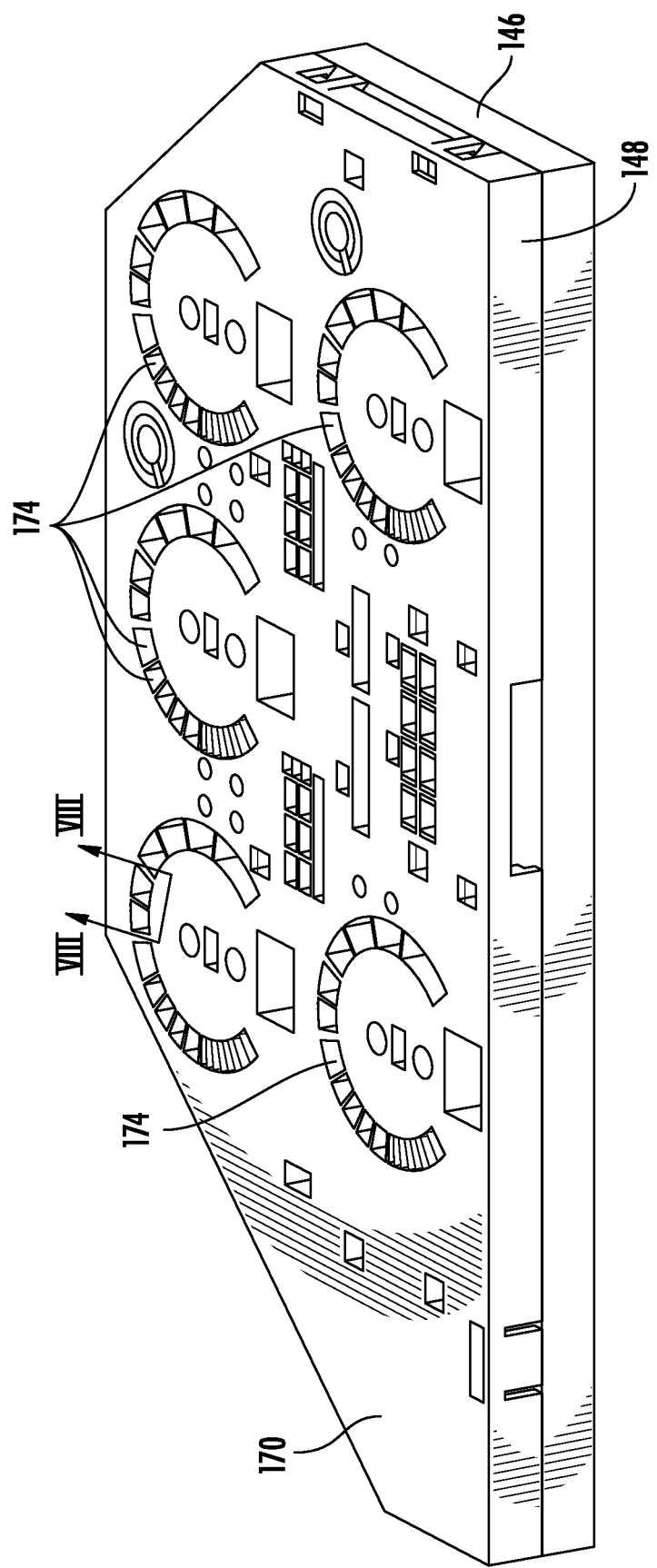
FIG. 7 provides a perspective view of an exemplary light guide assembled to a printed circuit board for a user interface in accordance with the present disclosure.

FIG. 7 is illustrative of light guide 148 assembled to printed circuit board 146 for a user interface in accordance with an embodiment of the present disclosure. For clarity, the diffuser stack 150 and panel 104 are not shown. When assembled as illustrated, each of the plurality of light channels 174 surround at least one light source 160 (see FIGS. 8 and 9) such that each light channel 174 directs all, or substantially all, of the light from the light source 160 in a direction perpendicular to, or substantially perpendicular to, the exit side 170 of light guide 148. As illustrated, for example, in FIG. 3, the light guide 148 directs the light to the diffuser stack 150. In the diffuser stack 150, the primary diffuser layer 154 and the dead front layer 152 (and the textured diffuser layer 156 if present) further condition the light to display a graphic on the display portion 122 of the panel 104.

Figure 8:
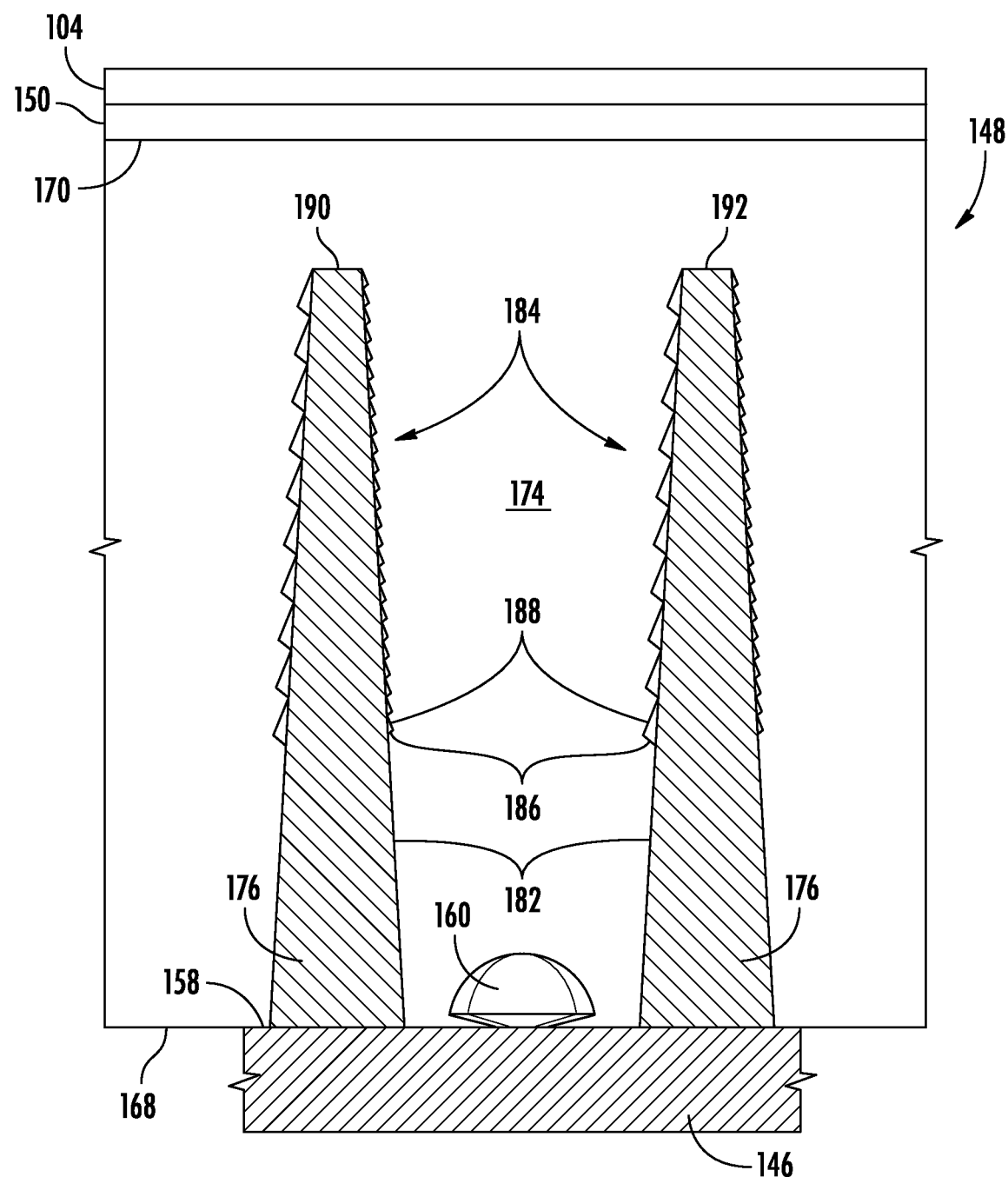
FIG. 8 provides a cross-sectional view of a light guide and a printed circuit board for a user interface taken at VIII-VIII of FIG. 7 in accordance with an embodiment of the present disclosure.

In the illustrative embodiment of FIG. 8, rib faces 182 are angled relative to vertical V (i.e., rib faces 182 are not perpendicular to the entrance side 168 of light guide 148). As illustrated, each rib face 182 is divergent from the vertical and opposing rib faces 182 are divergent from the entrance side 168, with each rib face 182 inclined from the vertical by two to five degrees, more particularly inclined by three degrees, or approximately three degrees, from the vertical.

In some embodiments, portions of the ribs 176 may have details that may facilitate the directing of light from the light sources 160. For example, opposing rib faces 182 that are directed towards the light channel 174 may include ridges or projections 184 that extend into the light channel 174. In the illustrative embodiment of FIG. 8, projections 184 comprise a series of linear surfaces 186 at an acute angle joined by linear surfaces 188 at an obtuse angle (acute and obtuse in reference to entrance side 168 of light guide 148). Such acute linear surfaces 186, or acute and obtuse linear surfaces 186, 188 together, may beneficially reflect an amount of off-axis light emanating from the light source 160 back towards the light source 160 to be reflected upward as angularly closer to on-axis light. By providing more on-axis light, the light channel 174 may present less divergent light to the diffuser stack 150, producing graphic display elements 138 with limited light bleed (i.e., sharper edge definition).

As illustrated in the exemplary embodiment of FIG. 8, left rib 190 and right rib 192 may have different projections 184 on the rib faces 182. In some embodiments, the projections 184 on left and right ribs 190, 192 may be of the same configuration (e.g., size, acute or obtuse angular measure, or pattern). In other embodiments, the projections 184 on left and right ribs 190, 192 may be of different configurations. In some embodiments, the projections 184 may have non-linear surfaces extending into the interior of the light channel 174. In embodiments of the user interface assembly 144 having multiple display elements 128, 130, 132, 134, 136, each of the display elements 128, 130, 132, 134, 136 may be coupled with light channels 174 having different configurations of projections 184, or the same configuration of projections 184, or combinations of configurations for the projections 184 in the light channels 174.

Figure 9:
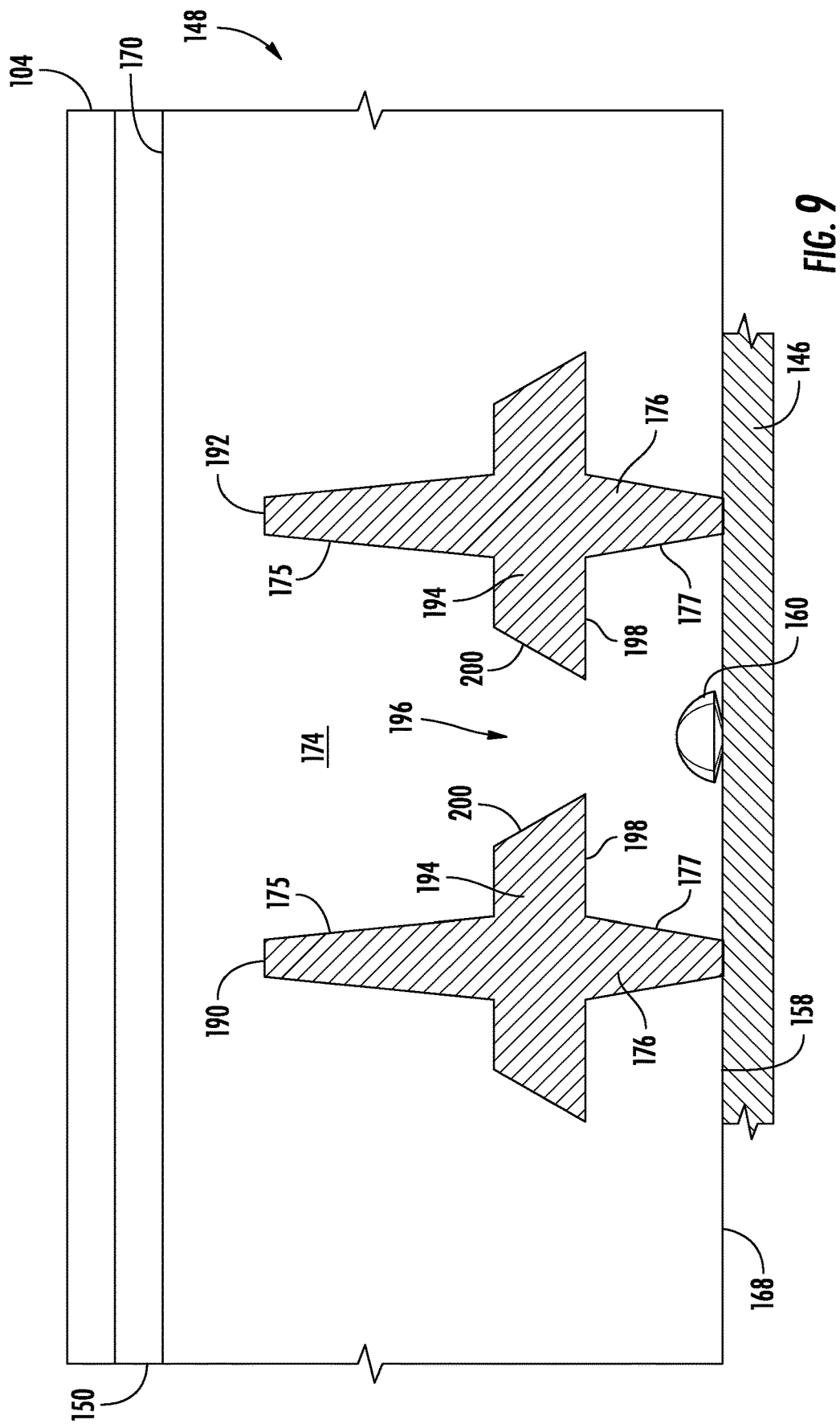
FIG. 9 provides a cross-sectional view of a light guide and a printed circuit board for a user interface taken at of FIG. 7 in accordance with an embodiment of the present disclosure.

In the illustrative embodiment of FIG. 9, each rib 176 comprises a ledge 194 extending into the light channel 174 and a divergent rib face 175 proximate to the exit side 170 and a convergent rib face 177 proximate to the entrance side 168, divergent and convergent in the upward vertical direction V. The divergent rib face 175 and the convergent rib face 177 are inclined from the vertical between five and ten degrees, more particularly the divergent and convergent rib faces 175, 177 are inclined eight degrees, or approximately eight degrees, from the vertical V.

As illustrated, left rib 190 and right rib 192 each have a ledge 194 extending partially into the light channel 174, each ledge having an inward directed divergent ledge face 200. Each of the ledge faces 200 are inclined from the vertical V between twenty and forty degrees, more particularly the ledge faces are inclined thirty degrees, or approximately thirty degrees, from the vertical. Two ledge faces 200 from consecutive ribs 190, 192 cooperate to form an aperture 196 centrally located above the light source 160.

Figure 10:
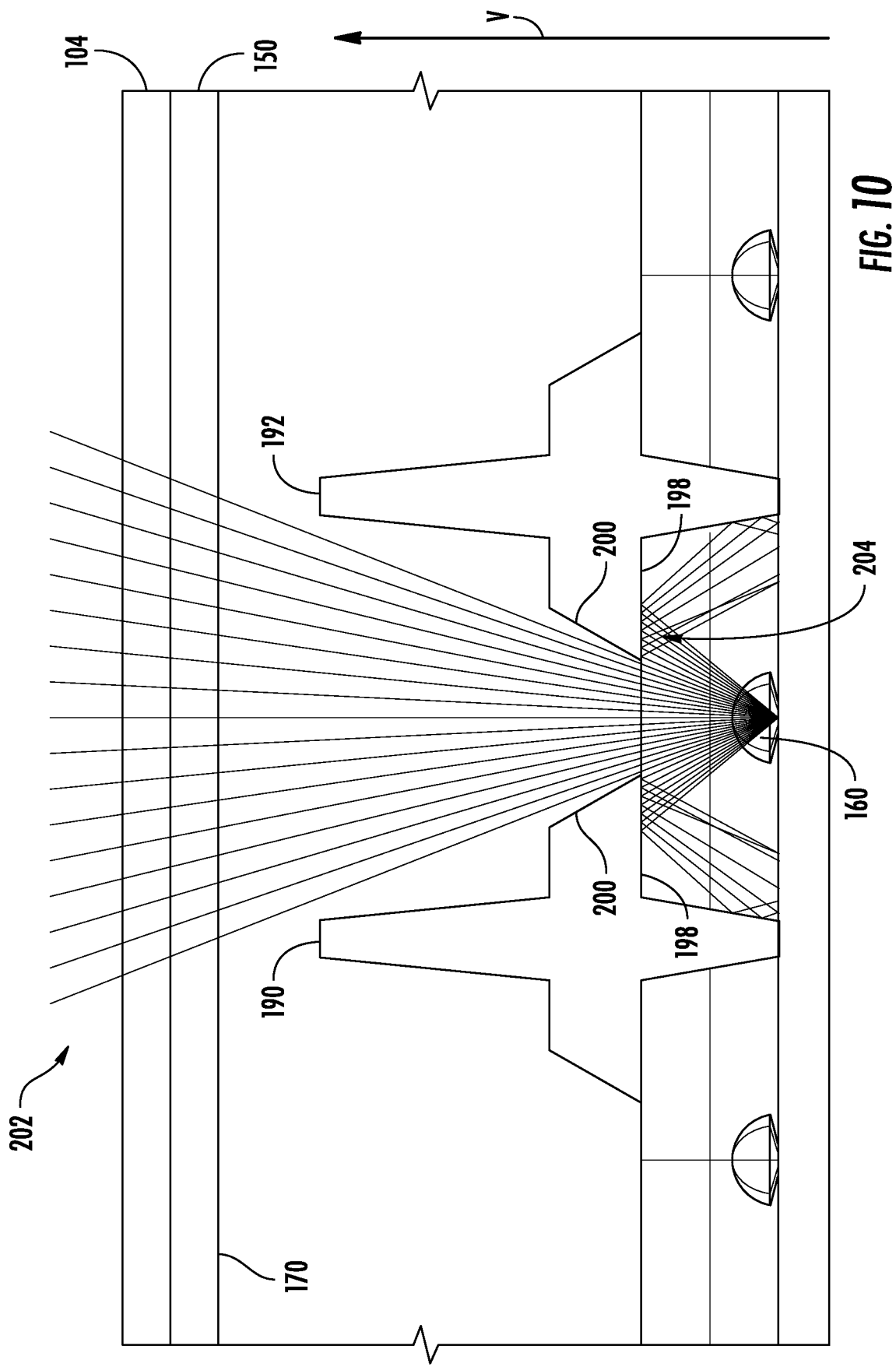
FIG. 10 represents the cross-sectional view of FIG. 9 showing on-axis and off-axis light paths.

The ledge 194 includes a bottom surface 198 generally parallel with the entrance side 168 of the light guide 148. As illustrated in FIG. 10, some on-axis light 202, or approximately on-axis light, emitted from the light source 160 travels through the aperture 196 without influence from any portion of the left or right ribs 190, 192. The bottom surface 198 may beneficially control some off-axis light 204 emanating from the light source 160. For example, the bottom surface 198 may reflect some off-axis light 204 back towards the light source 160 where it may be reflected upward, into the light channel 174, as angularly closer to on-axis light 202. In general, on-axis light 202 refers to light emitted from the light source 160 within approximately twenty-five degrees of the vertical axis V. Any light emitted that diverges more than approximately twenty-five degrees of vertical is considered off-axis light 204.

Returning to FIG. 3, the arrangement 162 of light sources 160 on the user interface printed circuit board 146 is such that each light channel 174 surrounds at least one individual light source 160 when the entrance side 168 of the light guide 148 is brought into contact with the printed circuit board 146 (as in FIG. 7). In such a configuration, the light channels 174 are positioned to direct a passage of all, or substantially all, of the light entering the light guide from the light source 160. The configuration of the ribs and light channels reduces the amount of off-axis light that reaches the diffuser stack 150.

In embodiments, the light sources 160, for example LEDs, emits light over a wavelength of approximately 400 nanometers (nm) to approximately 700 nanometers (nm). At this range of wavelengths, it may be beneficial to provide guide surfaces, e.g., inner and outer walls 178, 180 and ribs 176 forming the light channels 174, with an average spectral reflectance of between 30% and 85%, more preferably between 30% and 60%, more preferably still having a spectral reflectance of 36.5%, or approximately 36.5%. In some embodiments, the inner and outer walls 178, 180 and the ribs 176 are painted or coated, or otherwise processed, to have a spectral reflectance of approximately 36.5%. In other embodiments, the entire light guide 148 may be formed from a material with a spectral reflectance of approximately 36.5%. In some embodiments, a spectral reflectance of approximately 36.5% corresponds to a gray color.

In embodiments, the light channels 174 condition the light emitted from the light source(s) 160 such that less divergent light passes through the light guide 148, the diffuser stack 150, and is incident upon bottom interior surface of the panel 104 to display a graphic with limited light bleed. The light guide 148 and the diffuser stack 150 contribute to the on-axis nature of the light provided to the panel 104 and the resultant reduced light bleed. In particular, in some embodiments, a light guide 148 spectral reflectance of 36.5%, a diffuser stack 150 including a primary diffuser layer 154 with a diffusion angle of approximately 15 degrees, and light channels 174 having projections 184, or having ledges 194 forming apertures 196, cooperate to form uniformly displayed display elements 138 with minimal light bleed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A user interface assembly for an appliance, the user interface assembly comprising:
  a panel including a user interface comprising a display portion within the user interface;
  a printed circuit board spaced apart from the panel, the printed circuit board comprising a plurality of light sources;
  a diffuser stack disposed between the printed circuit board and the panel;
  a light guide disposed between the printed circuit board and the diffuser stack, the light guide defining a thickness between an entrance side and an exit side, the light guide comprising a plurality of light channels through the thickness, wherein adjacent light channels are separated by a rib extending from the entrance side partially through the thickness; and wherein each of the plurality of light channels surrounds a light source of the plurality of light sources such that each light channel directs a passage of substantially all light from the light source through the light guide to the panel in order to display a graphic in the display portion, and wherein the rib includes a plurality of angular projections facing a light channel of the plurality of light channels, the angular projections forming an acute angle with the entrance side.

2. The user interface assembly for an appliance of claim 1, wherein the diffuser stack comprises a primary diffuser layer disposed between the light guide and the panel and a dead front layer disposed between the primary diffuser layer and the panel.

3. The user interface assembly for an appliance of claim 2, wherein the dead front layer is color matched to an ink used on the panel so that the printed circuit board and the light guide of the user interface assembly are not visible through the panel when the user interface is in an off condition.

4. The user interface assembly for an appliance of claim 2, wherein the primary diffuser layer has a scattering angle of about 15 degrees.

5. The user interface assembly for an appliance of claim 1, wherein each of the plurality of light channels is formed from two spaced apart walls and the rib extends through approximately 50% of the thickness.

6. The user interface assembly for an appliance of claim 5, wherein the rib comprises a rib face divergent from a vertical direction.

7. The user interface assembly for an appliance of claim 5, wherein the two spaced apart walls are concentric arcs.

8. The user interface assembly for an appliance of claim 5, wherein the two spaced apart walls and the rib have an average spectral reflectance of between 30% and 60% over a wavelength range of approximately 400 nanometers to approximately 700 nanometers.

9. The user interface assembly for an appliance of claim 1, wherein each rib comprises a ledge extending into a light channel of the plurality of light channels parallel to the entrance side such that two consecutive projections form an aperture to limit a divergent spread of light from the light source.

10. The user interface assembly for an appliance of claim 9, wherein each rib further comprises:
a divergent rib face and a convergent rib face; and
each ledge comprises an inward directed divergent face.

11. A cooktop appliance comprising:
a panel comprising a cooking zone;
a plurality of heating elements positioned adjacent to the cooking zone for heating a cooking utensil disposed on the cooking zone; and
a user interface assembly comprising:
  a user interface defined on the panel, the user interface comprising a display portion;
  a printed circuit board spaced apart from the panel, the printed circuit board comprising a plurality of light sources;
  a diffuser stack disposed between the printed circuit board and the panel;
  a light guide disposed between the printed circuit board and the diffuser stack, the light guide defining a thickness between an entrance side and an exit side, the light guide comprising a plurality of light channels through the thickness, wherein adjacent light channels are separated by a rib extending from the entrance side partially through the thickness; and wherein each of the plurality of light channels surrounds a light source such that the light channel directs a passage of substantially all light from the light source through the light guide to the panel in order to display a graphic in the display portion, and wherein each rib comprises a ledge extending into a light channel of the plurality of light channels parallel to the entrance side such that two consecutive projections form an aperture to limit a divergent spread of light from the light source.

12. The cooktop appliance of claim 11, wherein the diffuser stack comprises a primary diffuser layer disposed between the light guide and the panel and a dead front layer disposed between the primary diffuser layer and the panel.

13. The cooktop appliance of claim 12, wherein the dead front layer is color matched to an ink used on the panel so that the printed circuit board and the light guide of the user interface assembly are not visible through the panel when the user interface is in an off condition.

14. The cooktop appliance of claim 12, wherein the primary diffuser layer has a scattering angle of about 15 degrees.

15. The cooktop appliance of claim 11, wherein each of the plurality of light channels is formed from two spaced apart walls and the rib extends through approximately 50% of the thickness.

16. The cooktop appliance of claim 15, wherein the two spaced apart walls and the rib have an average spectral reflectance of between 30% and 60% over a wavelength range of approximately 400 nanometers to approximately 700 nanometers.

17. The cooktop appliance of claim 11, wherein the rib includes a plurality of angular projections facing a light channel of the plurality of light channels, the angular projections forming an acute angle with the entrance side.

18. The cooktop appliance of claim 11, wherein each rib further comprises:
a divergent rib face and a convergent rib face; and
each ledge comprises an inward directed divergent face.

19. A user interface assembly for an appliance, the user interface assembly comprising:
a panel including a user interface comprising a display portion within the user interface;
a printed circuit board spaced apart from the panel, the printed circuit board comprising a plurality of light sources;
a diffuser stack disposed between the printed circuit board and the panel;
a light guide disposed between the printed circuit board and the diffuser stack, the light guide defining a thickness between an entrance side and an exit side, the light guide comprising a plurality of light channels through the thickness, wherein adjacent light channels are separated by a rib extending from the entrance side partially through the thickness;

wherein each of the plurality of light channels surrounds a light source of the plurality of light sources such that each light channel directs a passage of substantially all light from the light source through the light guide to the panel in order to display a graphic in the display portion, and wherein each rib comprises a ledge extending into a light channel of the plurality of light channels parallel to the entrance side such that two consecutive projections form an aperture to limit a divergent spread of light from the light source.

20. The user interface assembly for an appliance of claim 19, wherein the diffuser stack comprises a primary diffuser layer disposed between the light guide and the panel and a dead front layer disposed between the primary diffuser layer and the panel.

* * * * *